United States Patent
Lo et al.

(10) Patent No.: US 10,631,670 B1
(45) Date of Patent: Apr. 28, 2020

(54) MOVEABLE HOOK APPARATUS

(71) Applicant: CAL-COMP BIG DATA, INC., New Taipei (TW)

(72) Inventors: Teng-Nan Lo, New Taipei (TW); Chih-Feng Cheng, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 16/450,962

(22) Filed: Jun. 24, 2019

(30) Foreign Application Priority Data

Feb. 1, 2019 (TW) .............................. 108104266 A

(51) Int. Cl.
| | |
|---|---|
| *A47F 5/00* | (2006.01) |
| *A47G 1/16* | (2006.01) |
| *F16B 45/02* | (2006.01) |
| *F16B 45/06* | (2006.01) |
| *A47F 5/02* | (2006.01) |

(52) U.S. Cl.
CPC .............. *A47G 1/1606* (2013.01); *A47F 5/02* (2013.01); *F16B 45/02* (2013.01); *F16B 45/06* (2013.01)

(58) Field of Classification Search
CPC ......... A47G 1/1606; A45F 5/02; A45F 5/021; F16B 45/06; F16B 45/02
See application file for complete search history.

(56) References Cited

U.S. PATENT DOCUMENTS

| | | | | |
|---|---|---|---|---|
| 5,026,016 A | * | 6/1991 | Lisowski | F16B 21/09 248/225.11 |
| 5,850,996 A | * | 12/1998 | Liang | A45F 5/02 248/221.11 |
| 6,237,201 B1 | * | 5/2001 | Bonaiti | F16B 45/02 24/598.5 |
| 6,371,424 B1 | * | 4/2002 | Shaw | F16M 11/041 248/187.1 |
| 7,261,264 B2 | * | 8/2007 | Moran | A01K 1/0356 24/573.11 |
| 7,726,706 B2 | * | 6/2010 | Moran | A01K 1/0356 292/194 |
| 8,011,071 B2 | * | 9/2011 | O'Brien | A61M 16/1075 224/197 |

(Continued)

FOREIGN PATENT DOCUMENTS

FR 386896 A * 6/1908 .......... A47G 1/1606

*Primary Examiner* — Kimberley S Wright
(74) *Attorney, Agent, or Firm* — Chun-Ming Shih; HDLS IPR Services

(57) ABSTRACT

A movable hook apparatus, used for an object and a supporting structure, includes positioning axle attached onto the object and insertion member protruded therefrom, securement base attached onto the supporting structure; and a pair of rotating hook members with pivotal attachment portion pivotally attached onto securement base, hooking portion at the pivotal attachment portions and counter weight portion at outer side thereof to achieve equilibrium state; gap between two hooking portions is greater than width of insertion member, and a minimum of the gap is smaller than the width of insertion member. The insertion member is inserted between two hooking portions. When the two hooking portions are locked and positioned by the insertion member, the two hooking portions supports the weight of the positioning axle and the object.

12 Claims, 8 Drawing Sheets

(56) References Cited

U.S. PATENT DOCUMENTS

| | | | | |
|---|---|---|---|---|
| 8,573,576 | B2* | 11/2013 | Clark | B25B 5/04 |
| | | | | 269/157 |
| 8,919,623 | B1* | 12/2014 | Bergeron | A45F 5/02 |
| | | | | 224/148.4 |
| 9,611,875 | B2* | 4/2017 | Likosar | A63C 11/02 |
| 10,238,184 | B2* | 3/2019 | Moran | A44B 11/26 |
| 10,358,093 | B1* | 7/2019 | Ewel | B60R 7/08 |
| 10,400,949 | B1* | 9/2019 | Kozak | F16M 13/02 |
| 2007/0045492 | A1* | 3/2007 | Moran | A01K 1/0356 |
| | | | | 248/222.11 |

* cited by examiner

… (1)

MOVEABLE HOOK APPARATUS

BACKGROUND OF THE INVENTION

Field of the Invention

The technical field relates to a hook, in particular, to a movable hook apparatus.

Description of Related Art

To mount objects of paintings, photo frames, mirrors or screens etc., the rear surfaces of the subjects equipped with locking slots are typically used to mount onto hooks on the wall. The hooks are able to penetrate into and lock onto the locking slots in order to achieve the objective of mounting objects of paintings, photo frames, mirrors or screens etc.

The aforementioned objects merely use the locking slots for mounting onto the hooks; nevertheless, the locking stability between the two is still insufficient. When such object is subject to collision or wobbling, the object can easily disengage from the hook and fall onto the floor. Accordingly, there is a need for the developers in the industry to increase the locking stability of a hook.

In view of above, the inventor seeks to overcome the aforementioned drawbacks associated with the currently existing technology after years of research and development along with the utilization of academic theories, which is also the objective of the development of the present invention.

SUMMARY OF THE INVENTION

The disclosure is related to a movable hook apparatus, capable of utilizing the weight of a positioning shaft and an object to drive an insertion member and two hooking portions to lock onto each other in position, and using two counter weight portions to limit the two hooking portions under an equilibrium state in order to achieve the advantageous effects of preventing disengagement of the object, automatic restoration and facilitated mounting function for the movable hook apparatus.

One of the exemplary embodiments, a movable hook apparatus, used for an object and a supporting structure, comprises: a positioning axle attached onto the object and having an insertion member protruded from an outer perimeter thereof; a securement base attached onto the supporting structure; and a pair of rotating hook members, each of the rotating hook members and a pivotal attachment portion pivotally attached onto the securement base and having a hooking portion arranged at an inner side of each of the pivotal attachment portions and a counter weight portion arranged at an outer side to extend therefrom, such that when each of the counter weight portions and each of the hooking portion are under an equilibrium state, a gap between the two hooking portions is greater than a width of the insertion member, and a minimum value of the gap between the two hooking portions being smaller than the width of the insertion member; wherein the insertion member is inserted between the two hooking portions under the equilibrium state until the two hooking portions are locked by the insertion member in position such that the two hooking portions are able to support a weight of the positioning axle and the object.

According to the above, each of the hooking portions includes a hooking piece extended therefrom. When the two hooking portions are locked by the insertion member in position, the two hooking pieces abut against the positioning axle in order to reduce a contact surface between the two hooking portions and the positioning axle, thereby preventing large area of wear and damage between the positioning axle and the hooking portions.

In addition, according to the above, one of the hooking portions forms an L shape with counter weight portion, and another one of the hooking portions forms an inverse L shape with the counter weight portion. When the two hooking portions are locked by the insertion member in position, the left and rights sides of the positioning axle can be blocked and retained by the two counter weight portions in order to prevent the positioning axle from disengaging or falling from the two hooking portions.

DETAILED DESCRIPTION OF THE INVENTION

The following provides a detailed technical content of the present invention along with the accompanied drawings. However, the accompanied drawings are provided for reference and illustrative purpose only such that they shall not be used to limit the scope of the present invention.

Please refer to FIG. 1 to FIG. 6. The present invention provides a movable hook apparatus, and such movable hook apparatus 10 mainly comprises a positioning axle 1, a securement base 2 and a pair of rotating hook members 3.

Figure 1:
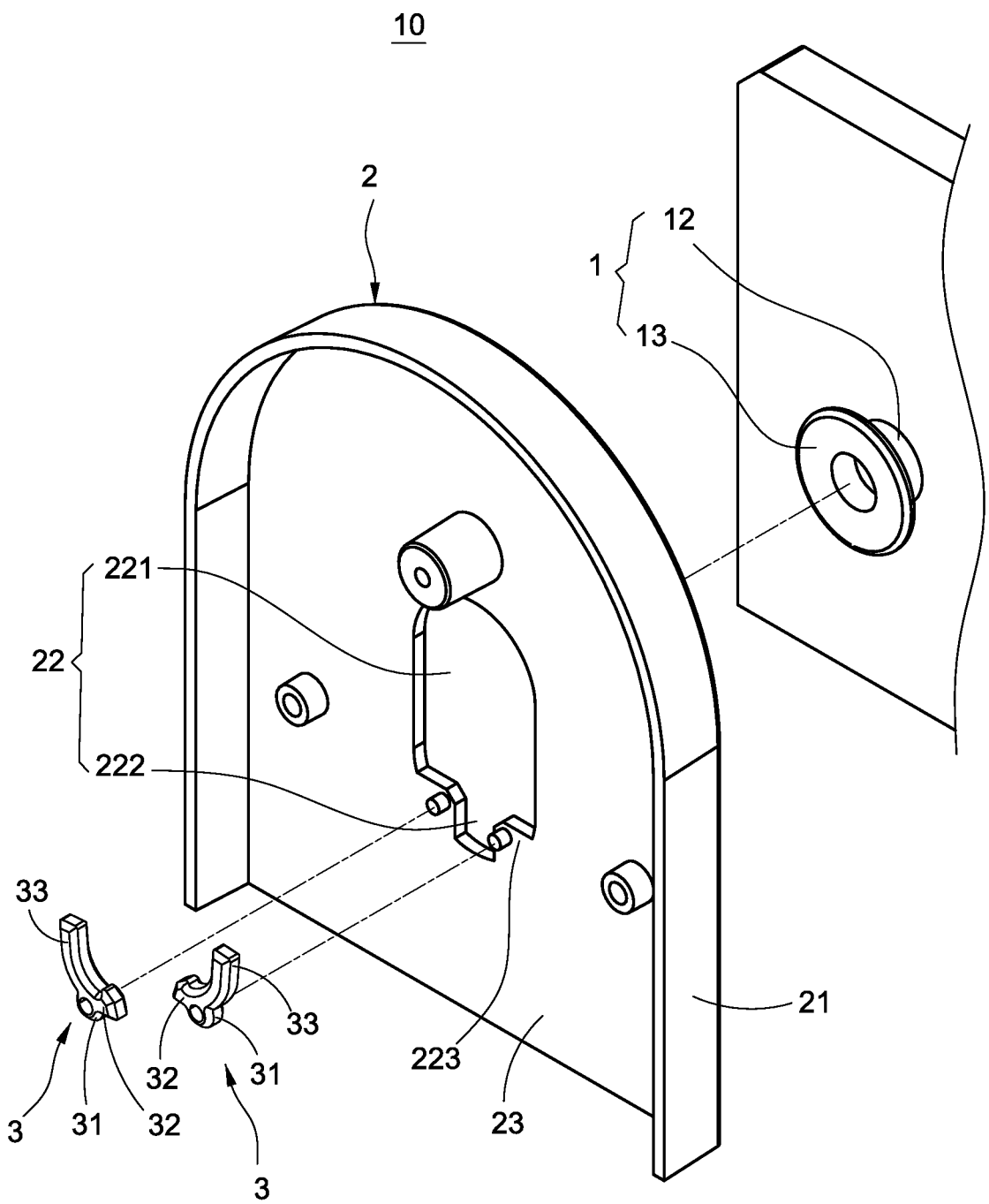
FIG. 1 is a perspective view of the movable hook apparatus according to an exemplary embodiment of the present invention.
Figure 2:
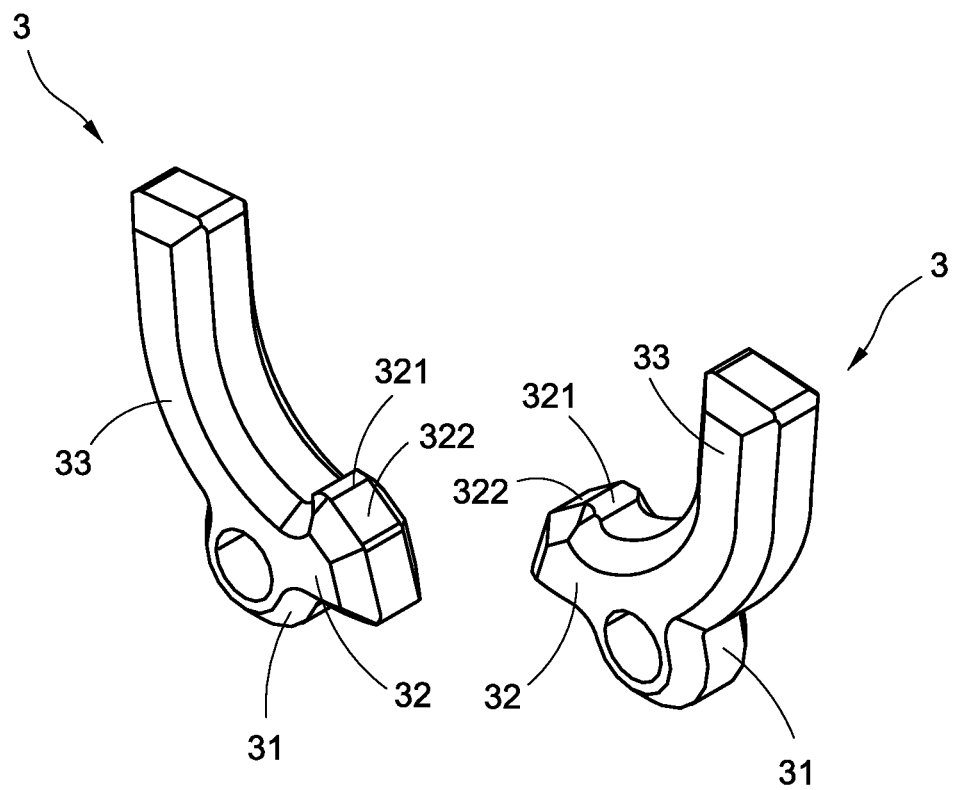
FIG. 2 is a perspective view of the rotating hook members of the present invention.
Figure 3:
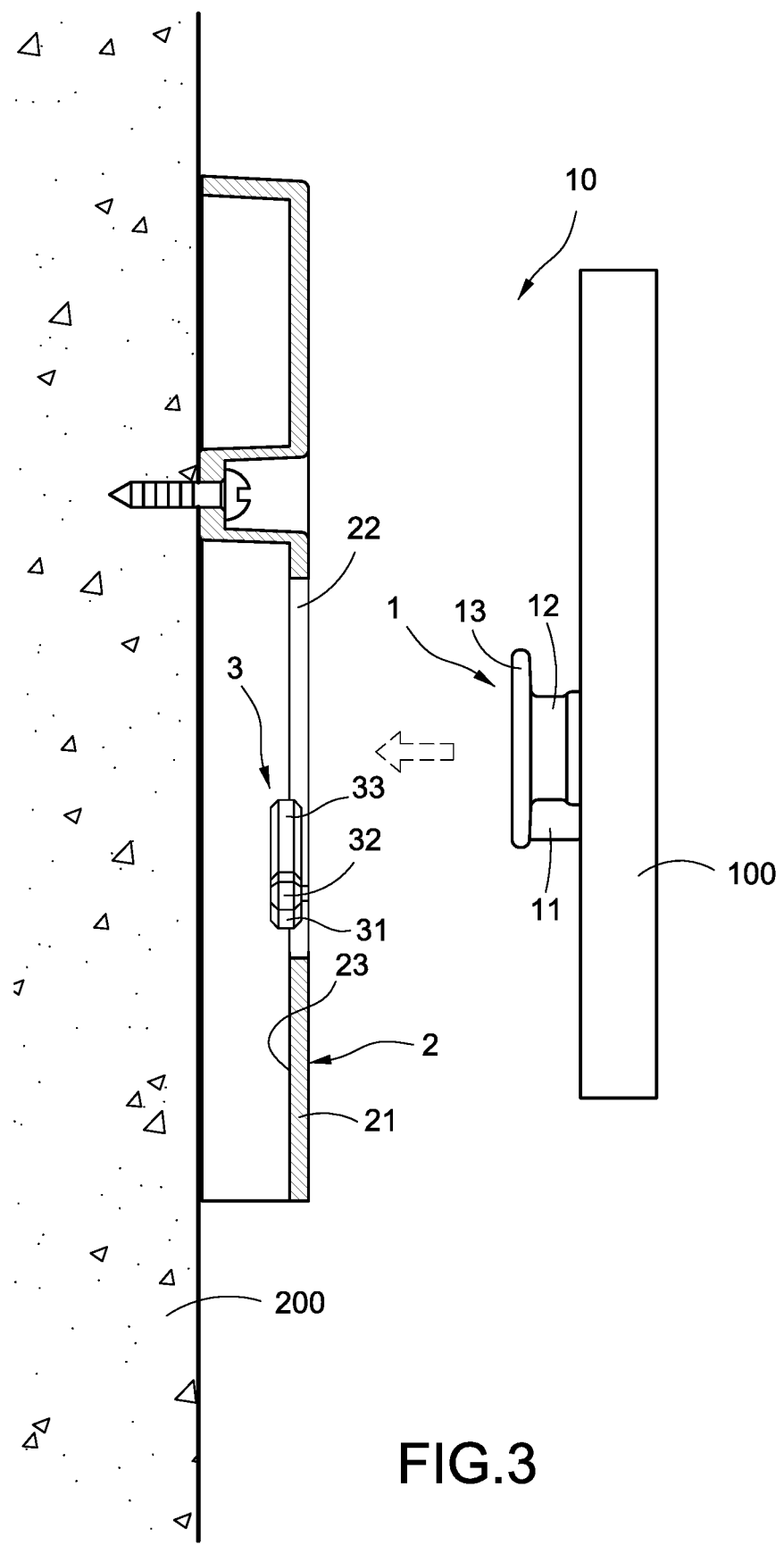
FIG. 3 is an illustration showing a first state of use of the movable hook apparatus of the present invention.
Figure 6:
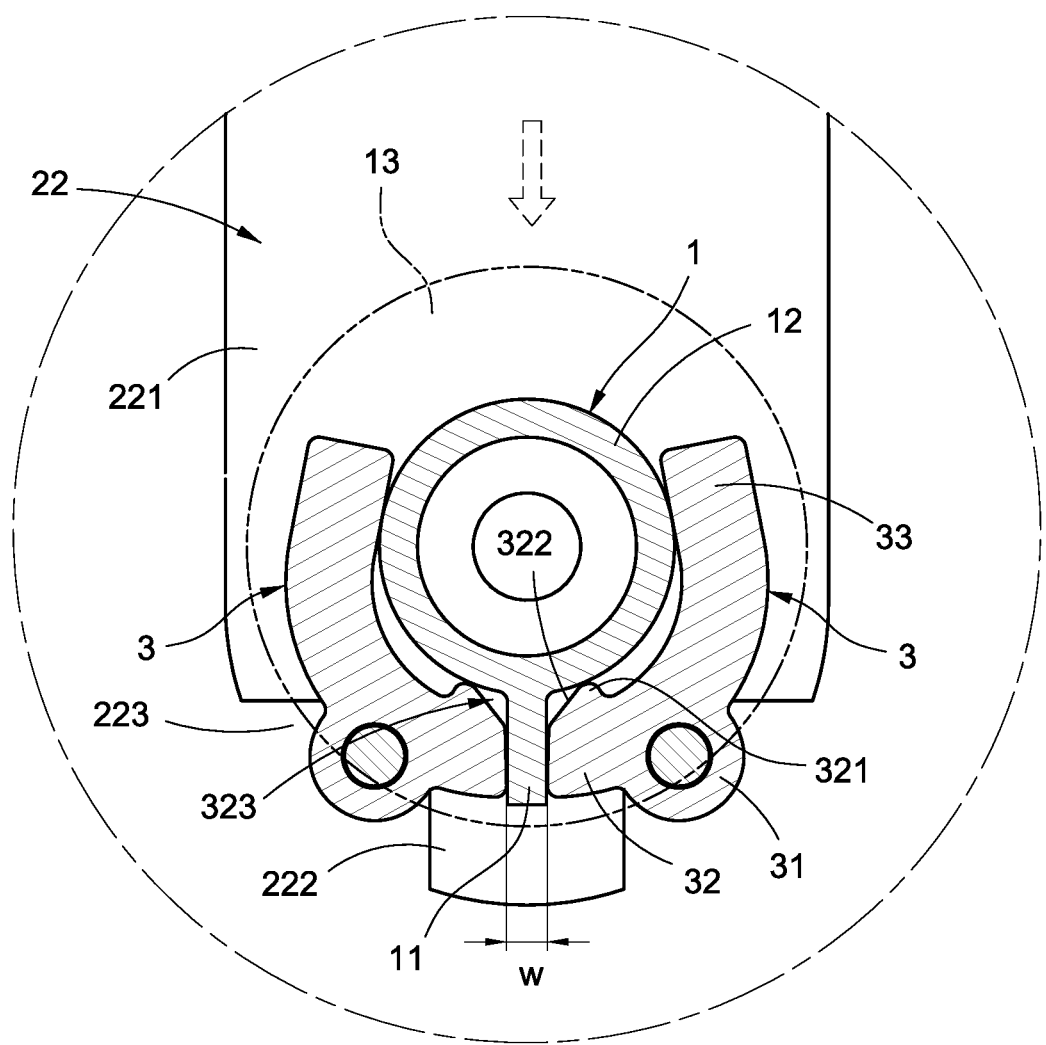
FIG. 6 is an illustration showing a fourth state of use of the movable hook apparatus of the present invention.

As shown in FIG. 1, FIG. 3 and FIG. 6, the positioning axle 1 is attached onto an object 100, such as a painting, photo frame, mirror, screen etc. In addition, the outer perimeter of the positioning axle 1 includes an insertion member 11 protruded therefrom.

The following provides further detailed description. The positioning axle 1 includes an axle shaft 12 and a head portion extended from the rear end of the axle shaft 12. The perimeter dimension of the head portion 13 is greater than the dimension of the perimeter of the axle shaft. In addition, the insertion member 11 is formed to extend outward from the outer perimeter of the axle shaft 12. As shown in FIG. 1 and FIG. 3, the positioning axle 1 is integrally formed on the object 100; however, the present invention is not limited to such configuration only.

As shown in FIG. 1, FIG. 3 to FIG. 6, the securement base 2 is attached onto a supporting structure 200, such as a wall, stand etc. The securement base 2 is a hollow housing 21. The hollow housing 21 includes a cut-out slot 22 and an inner side wall 23. The cut-out slot 22 is divided into a first opening 221 and a second opening 222. The dimension of the first opening 221 is greater than the dimension of the second opening 222. In addition, the hollowing housing 21 includes two neck portions 223 formed between the first opening 221 and the second opening 222. In an exemplary embodiment, the hollowing housing 21 is secured onto the supporting structure 200 via a fastening method, i.e. the securement base 2 is secured onto the supporting structure 200 via a fastening method, and the securement base 2 refers to a wall; however, the present invention is not limited to such configuration only.

As shown in FIG. 1 to FIG. 6, each rotating hook member 3 includes a pivotal attachment portion 31 pivotally attached onto the securement 1, and each rotating hook member 3 includes a hooking portion 32 arranged at an inner side of each pivotal attachment portion 21 and a counter weight portion 33 at an outer side thereof. Each counter weight portion 33 and each hooking portion 32 use each pivotal attachment portion 31 as a supporting point for rotation. Consequently, the gap s between the two hooking portions 32 changes due to different locations of the rotation. However, the minimum gap s between the two hooking portions 32 needs to be smaller than the width w of the insertion member 11. In other words, the minimum value of the gap s between the two hooking portions 32 needs to be smaller than the width w of the insertion member 11 in order to allow the insertion member 11 to be locked between the two hooking portions 32.

Figure 4:
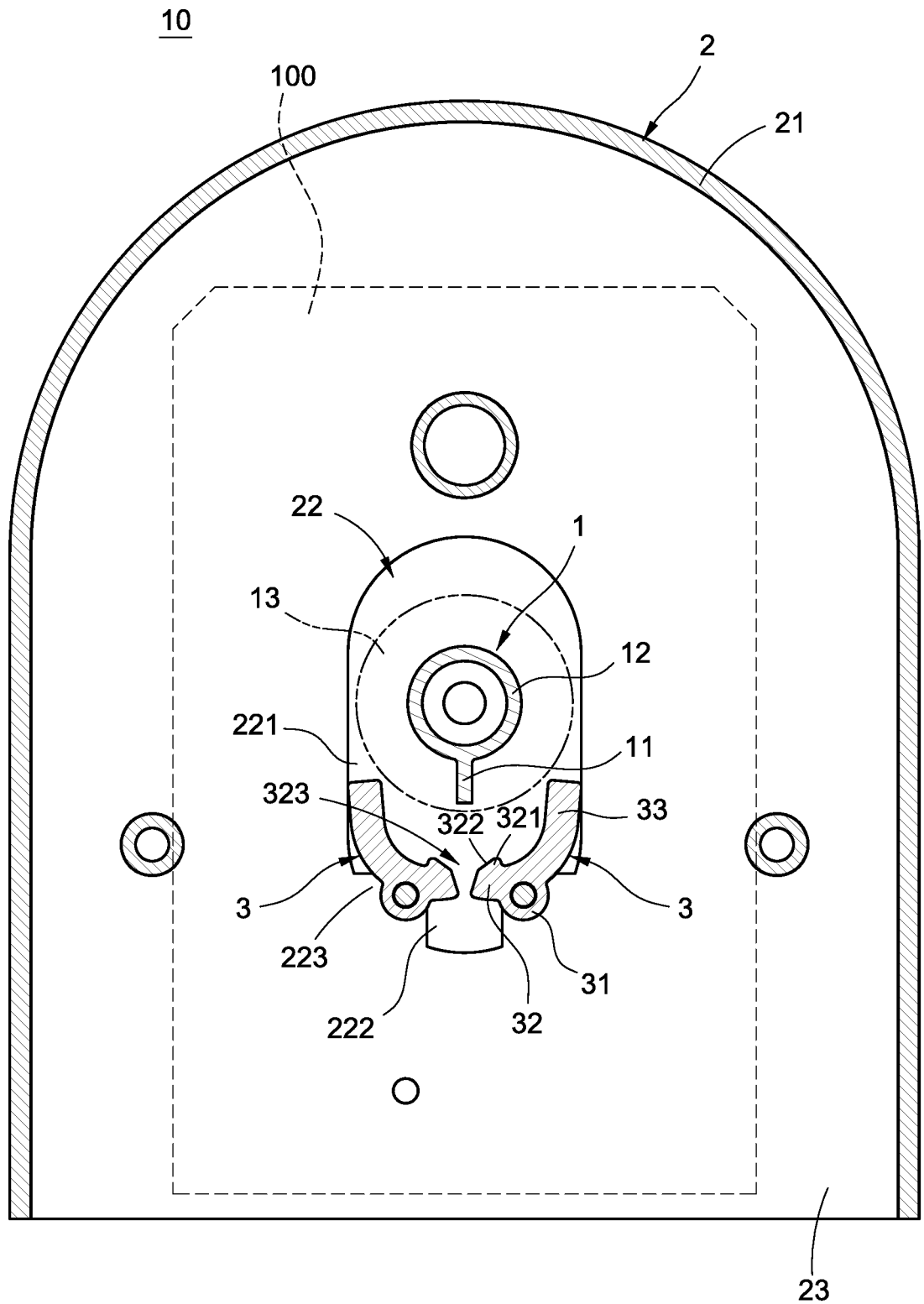
FIG. 4 is an illustration showing a second state of use of the movable hook apparatus of the present invention.
Figure 5:
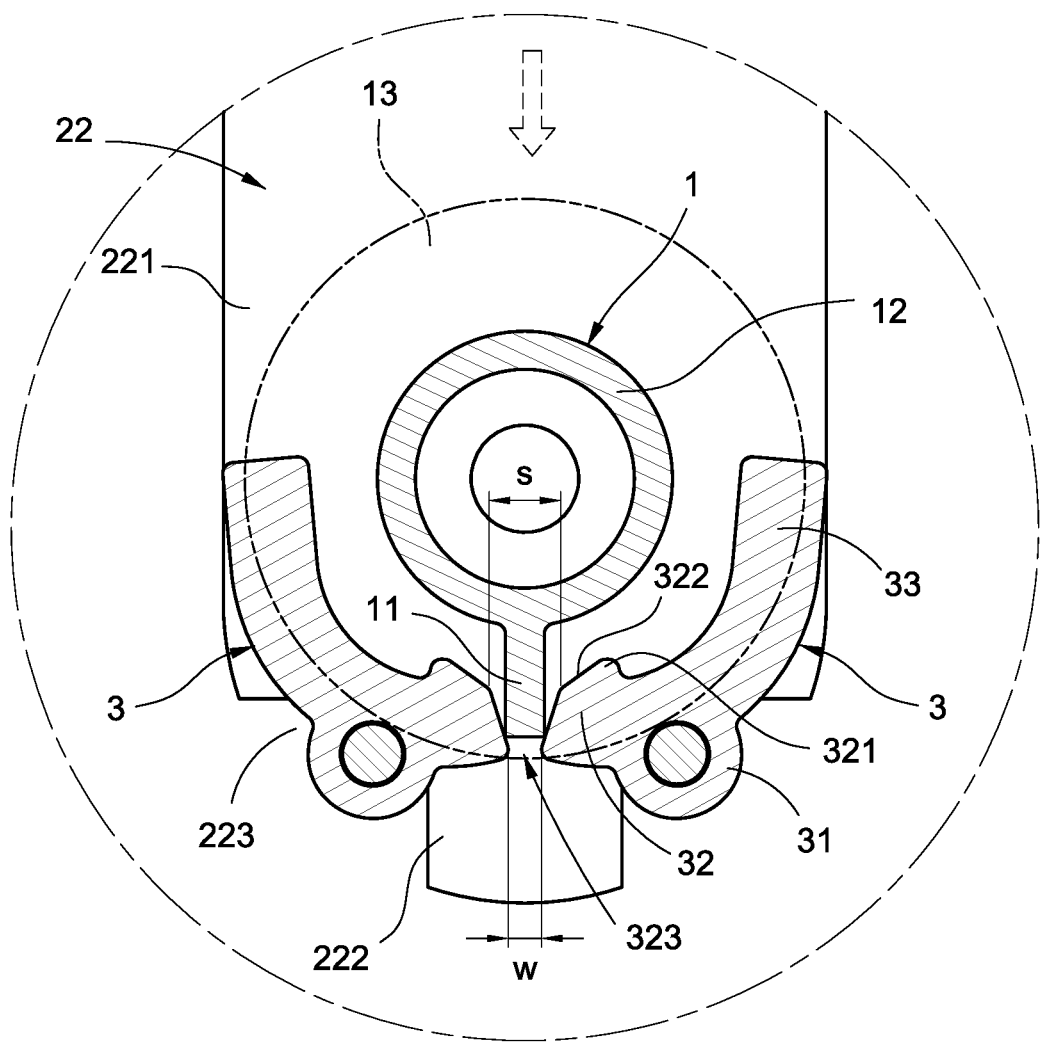
FIG. 5 is an illustration showing a third state of use of the movable hook apparatus of the present invention.

As shown in FIG. 4 and FIG. 5, when no force is applied onto the rotating hook members 3, each counter weight portion 33 and each hooking portion 32 are under an equilibrium state; in other words, the torque generated under the condition where the counter weight portion 33 uses the pivotal attachment portion 33 as a supporting point is the same as the torque generated under the condition where the hooking portion 32 uses the pivotal attachment portion 31 as a supporting point. Accordingly, the two counter weight portions 33 are able to limit the two hooking portions 32 to stay at an equilibrium position without further downward rotation, and such equilibrium position refer to a position where the two hooking portions 32 are of a gap s greater than width w of the insertion member 11. Furthermore, the position where the two hooking portions 32 are under the equilibrium state is higher than an area most adjacent to the two hooking portions 32.

In addition, as shown in FIG. 1 and FIG. 4, each pivotal portion 31 is pivotally attached onto each neck portion 223. Please refer to the following detailed description. In an exemplary embodiment, each neck portion 223 includes a pivotal axle extended therefrom, and each pivotal attachment portion 31 includes a pivotal attachment hole. Each pivotal axle is pivotally attached onto each pivotal attachment hole in order to achieve the effect of each rotating hook member 3 using the pivotal attachment portion 31 for pivotally attaching onto the securement base 1. Alternatively, each neck portion 223 can include a pivotal attachment hole, and each pivotal attachment portion 31 can include a pivotal axle extended therefrom in order to achieve the aforementioned effect.

Furthermore, as shown in FIG. 1 and FIG. 3, the rotating hook members 3 are pivotally attached at the inner side wall 23 of the hollow housing 21 and are received inside the hollow housing 21 in order to achieve a simple and neat visual sensation and to increase the appearance of the movable hook apparatus 10 of the present invention.

Moreover, as shown in FIG. 5 and FIG. 6, the two hooking portions 32 are arranged corresponding to the two openings 222. When the positioning axle 1 penetrates into and receives inside the cut-out slot 22, the dimension of the first opening 221 is greater than a shape of the dimension of the second opening 222, such that it is able to guide the positioning axle 1 to be successfully pressed onto the two hooking portions 32.

As shown in FIG. 3 to FIG. 6, different states of use of the movable hook apparatus 10 of the present invention are show. First, please refer to FIG. 3 to FIG. 5. Since the counter weight portion 33 and each hooking portion 32 are under an equilibrium state, the gap s between the two hooking portions 32 is greater than the width w of the insertion member 11. Therefore, the insertion member 11 can be inserted between the two hooking portions 32 via the equilibrium state successfully.

Next, as shown in FIG. 6, when the insertion member 11 is inserted between the two hooking portions 32, the weight of the positioning axle 1 and the object 100 continues to press the two hooking portions 32 downward and pushes the two hooking portions 32 to rotate downward until the gap s between the two hooking portions is filled by the width w of the insertion member 11 such that it cannot rotate further. In other words, when the two hooking portions 32 are locked by the insertion member 11 in position, the two hooking portions 32 are able to naturally support the weight of the positioning axle 1 and the object 100 in order to achieve the objective of installing the object 100 onto the supporting structure.

Accordingly, the weight of the positioning axle 1 and the object 100 can drive the insertion member 11 and the two hooking portions 32 to lock onto each other in position such that the heavier the weight of the object 100, the harder it can disengage from the hooking portion 32. Consequently, the movable hook 10 of the present invention is able to achieve the advantageous effect of preventing disengagement and falling of the objection.

Furthermore, when the object 100 is removed from the top and disengages from the two hooking portions 32, the two counter weight portions 33 are able to retain the two hooking portions 32 to be under an equilibrium state without further rotation downward as well as to allow the gap s between the two hooking portions 32 to be greater than the width w of the insertion member 11. Therefore, the insertion 11 can be successfully inserted between the two hooking portions 32 again next time, and the advantageous effect of automatic restoration and facilitated mounting function of the movable hook apparatus 10 of the present invention can be achieved.

Moreover, when the two hooking portions 22 are locked by the insertion member 11 in position, such pair of rotating hook members 3 are clamped between the head portion 12 and the object 100. In other words, the rotating hook members 3 are locked onto the head portion 12 with each other in position in order to prevent the positioning axle 1 to disengage or fall from the two hooking portions 32 in the axial direction.

In addition, each hooking portion 32 includes a hooking piece 321 extended from a rear end thereof. When the two hooking portions 32 are locked by the insertion member 11 in position, the two hooking pieces 321 abut against the positioning axle 1 such that the contact area between the two hooking portions 32 and the positioning axle 1 is reduced in order to prevent large area of wear and damage between the positioning axle 1 and the hooking portion 32.

Furthermore, each hooking piece 321 includes a slanted edge 322 formed at an inner side thereof. When each counter weight portion 33 and each hooking portion 32 are under an equilibrium state, the inner sides of the two hooking pieces 321 jointly form a V-shape notch 323. Such V-shape notch 323 is able to allow the insertion member 11 to be successfully inserted between the two hooking portions 32.

Moreover, one of the hooking portions 32 forms an L shape with counter weight portion 33, and another one of the hooking portions 32 forms an inverse L shape with the counter weight portion 33. Therefore, when the two hooking portions 32 are locked by the insertion member 11 in position, since the two hooking portions 32 are arranged horizontally, the two counter weight portions 33 are arranged vertically in order to allow the left and rights sides of the positioning axle 1 to be blocked and retained by the two counter weight portions 33. Consequently, the positioning axle 1 can be prevented from disengagement or falling from the two hooking portions 32.

Figure 7:
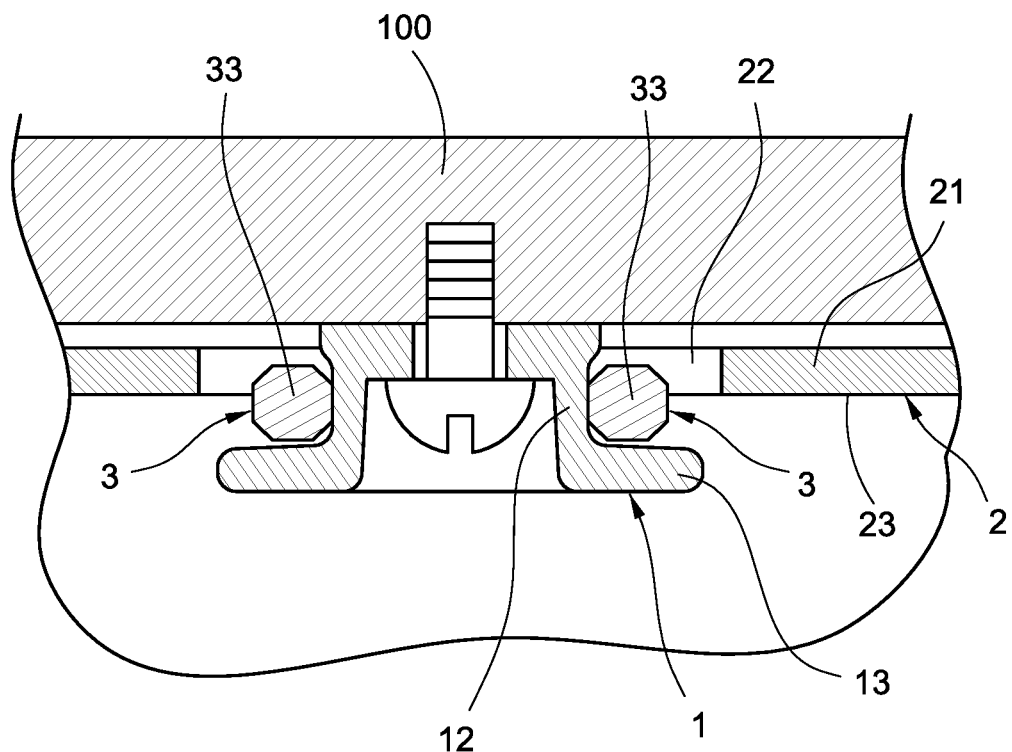
FIG. 7 is an illustration showing a station of use of the movable hook apparatus according to another exemplary embodiment of the present invention.

Please refer to FIG. 7, showing another exemplary embodiment of a movable hook apparatus 10 of the present invention. The exemplary embodiment shown in FIG. 7 is generally identical to the exemplary embodiment shown in FIG. 6. The difference between the exemplary embodiment of FIG. 7 and the exemplary embodiment of FIG. 6 relies in that the positioning axle 1 is secured onto the object 100 via a fastening method; however, the present invention is not limited to such configuration only.

Figure 8:
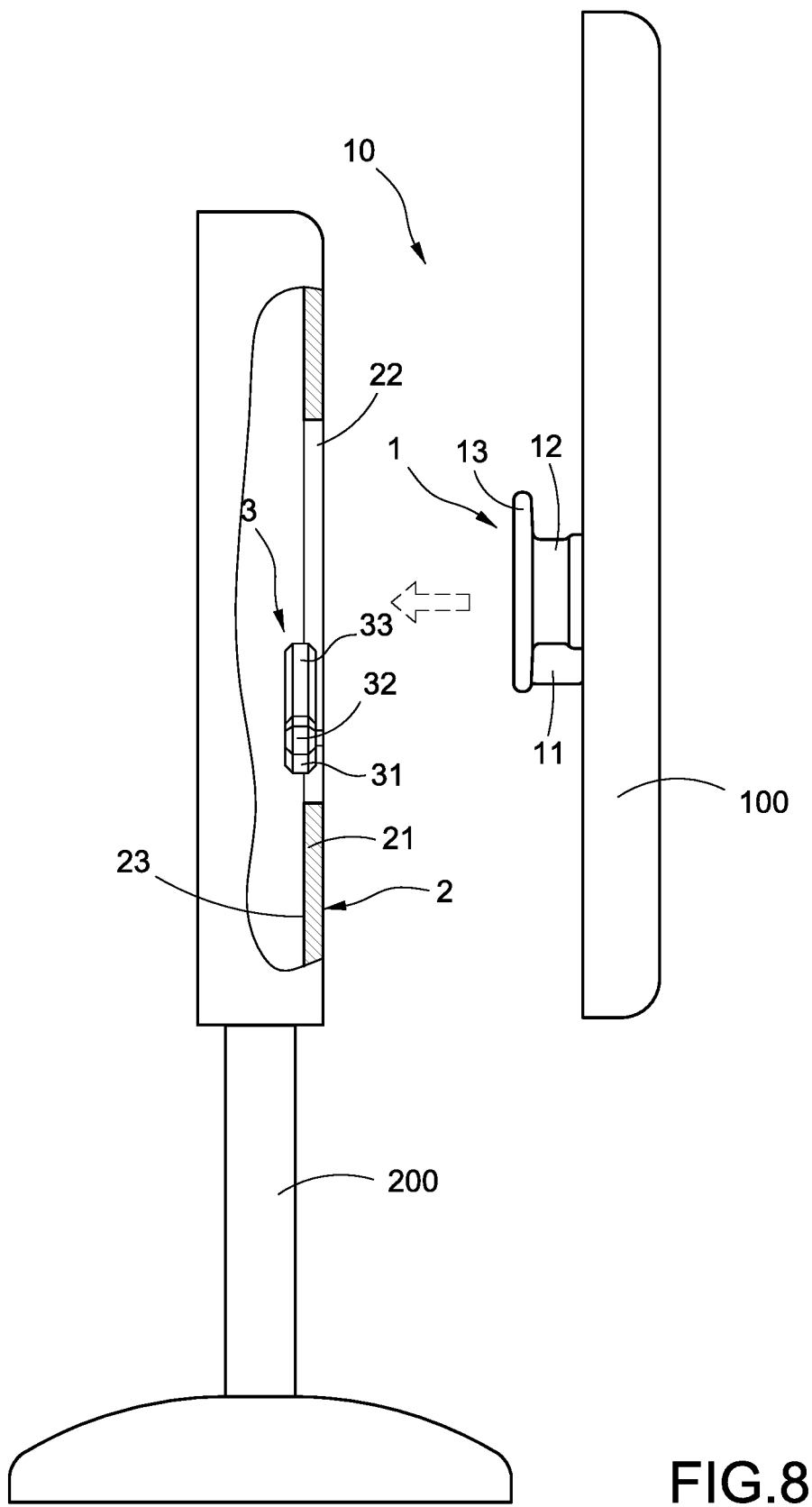
FIG. 8 is an illustration showing a station of use of the movable hook apparatus according to still another exemplary embodiment of the present invention.

Please refer to FIG. 8, showing still another exemplary embodiment of a movable hook apparatus 10 of the present invention. The exemplary embodiment shown in FIG. 8 is generally identical to the exemplary embodiment shown in FIG. 6. The difference between the exemplary embodiment of FIG. 8 and the exemplary embodiment of FIG. 6 relies in that the securement base 2 is integrally formed on the supporting structure 200, and the securement base 2 refers to a stand; however, the present invention is not limited to such configuration only.

In view of the above, a movable hook structure of the present invention is able to achieve the objectives of the present invention and to overcome the drawbacks of known arts. The present invention is novel and of inventive step, which satisfies the patentability requirements. The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. A movable hook apparatus, used for an object and a supporting structure, comprising:
   a positioning axle attached onto the object and having an I-shaped insertion member protruded from an outer perimeter of a bottom side thereof;
   a securement base attached onto the supporting structure; and
   a pair of rotating hook members, each of the rotating hook members and a pivotal attachment portion pivotally attached onto the securement base and having a hooking portion arranged at an inner side of each of the pivotal attachment portions and a counter weight portion arranged at an outer side to extend therefrom, such that when each of the counter weight portions and each of the hooking portion are under an equilibrium state, a gap between the two hooking portions is greater than a width of the insertion member, and a minimum value of the gap between the two hooking portions being smaller than the width of the insertion member, each of the hooking portions includes an inverted-V-shaped hooking piece extended upwardly from a top of a rear end thereof;
   wherein the insertion member is inserted between the two hooking portions under the equilibrium state such that when the two hooking portions are locked and positioned by the insertion member in position, a width of the gap between the two hooking portions is the same as the width of the insertion member, the two hooking pieces abut against the positioning axle, the two hooking portions support a weight of the positioning axle and the object.

2. The movable hook apparatus according to claim 1, wherein each of the pivotal attachment portions is pivotally attached on the securement base, and each of the counter weight portion and each of the hooking portion use each of the pivotal attachment portions as a supporting point for rotation.

3. The movable hook apparatus according to claim 1, wherein the positioning axle includes an axle shaft and a head portion extended for a rear end of the axle shaft; a perimeter of the head portion is greater than a perimeter of the axle shaft, and the insertion member is formed to extend outward from an outer perimeter of the axle shaft, such that when the two hooking portions are locked by the insertion member in position, the pair of rotating hook members are clamped between the head portion and the object.

4. The movable hook apparatus according to claim 1, wherein each of the hooking pieces includes a slanted edge at an inner side thereof, such that when each of the counter weight portions and each of the hooking portions are under the equilibrium state, the inner sides of the two hooking pieces jointly form a V-shape notch.

5. The movable hook apparatus according to claim 1, wherein one of the hooking portions forms an L shape with counter weight portion, and another one of the hooking portions forms an inverse L shape with the counter weight portion, such that when the two hooking portions are locked by the insertion member in position, left and rights sides of the positioning axle are blocked and retained by the two counter weight portions.

6. The movable hook apparatus according to claim 1, wherein the securement base is a hollow housing, the hollow housing includes a cut-out slot formed thereon, the pair of rotating hook members are arranged at left and rights sides of the cut-out slot, and the positioning axle penetrates into and receives inside the cut-out slot.

7. The movable hook apparatus according to claim 6, wherein the cut-out slot is divided into a first opening and a second opening, a dimension of the first opening is greater than a dimension of the second opening, and the hollow housing includes two neck portions formed between the first opening and the second opening; each of the pivotal attachment portions is pivotally attached onto each of the neck portions, and the two hooking portions are arranged corresponding to the second opening.

8. The movable hook apparatus according to claim 7, wherein the hollow housing includes an inner side wall, the pair of rotating hook members are pivotally attached onto the inner side wall and received inside the hollow housing.

9. The movable hook apparatus according to claim 8, wherein the securement base is secured onto the supporting structure via a fastening method.

10. The movable hook apparatus according to claim 1, wherein the positioning axle is integrally formed on the object.

11. The movable hook apparatus according to claim 1, wherein the positioning axle is secured onto the object via a fastening method.

12. The movable hook apparatus according to claim 1, wherein the securement base is integrally formed on the supporting structure.

\* \* \* \* \*